United States Patent
Nagata (10) Patent No.: US 7,245,286 B2
(45) Date of Patent: Jul. 17, 2007

(54) CELLULAR TELEPHONE

(75) Inventor: Hideaki Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 458 days.

(21) Appl. No.: 10/413,408

(22) Filed: Apr. 15, 2003

(65) Prior Publication Data

US 2003/0236109 A1    Dec. 25, 2003

(30) Foreign Application Priority Data

Apr. 17, 2002   (JP)   ............................. 2002-115411

(51) Int. Cl.
*G09G 5/00* (2006.01)
*G09G 5/08* (2006.01)

(52) U.S. Cl. ...................... 345/156; 345/157; 345/169; 715/784; 715/830

(58) Field of Classification Search ........ 345/156–169; 715/700, 784–787, 830
See application file for complete search history.

(56) References Cited

U.S. PATENT DOCUMENTS 5,122,785 A * 6/1992 Cooper ...................... 345/163
6,362,814 B1 * 3/2002 Aizawa ...................... 345/169
6,765,598 B2 * 7/2004 Kim ........................... 715/857

FOREIGN PATENT DOCUMENTS

| JP | 9-134248 A | | 5/1997 |
| JP | 9-282091 A | | 10/1997 |
| WO | WO 00/51358 | * | 8/2000 |
| WO | WO 00/51358 A | | 8/2000 |

* cited by examiner

*Primary Examiner*—Richard Hjerpe
*Assistant Examiner*—Duc Dinh
(74) *Attorney, Agent, or Firm*—Sughrue Mion, PLLC (57) ABSTRACT

A cellular telephone with a pointing device that facilitates operations for line scrolling and page scrolling, in which the moving speed of a pointer can be controlled with respect to each on-screen display. The pointing device includes a pointer-operating button having a range of sliding movement. The pointer-operating button can be pressed down and slide within the sliding movement range by single finger operation, and is located in the center of the sliding movement range when not being operated. The pointer-operating button returns to the center position when released in sliding operation, and returns to its former condition when released from the pressed state in pressing operation. Besides, the sliding movement range defines a pointer movement frame. A switch to line scrolling mode or page scrolling mode is made by bringing a pointer into contact with the top edge or the bottom edge of the pointer movement frame. The moving speed of the pointer can be controlled with respect to each on-screen display.

24 Claims, 10 Drawing Sheets

```
                CALCULATE NEXT POINTER DISPLAY POSITION ~S21
                                │
                                ▼
                          ╱S22╲
                         ╱ IS   ╲  INEFFECTIVE
              ──────────╱ SCROLLING╲──────────────────────┐
                        ╲ MODE    ╱                       │
                         ╲EFFECTIVE╱                      │
                          ╲OR    ╱                        │
                           ╲INEFFECTIVE╱                  │
                             │                            │
                             │ EFFECTIVE                  │
                             ▼                            │
                          ╱S23╲                           │
                         ╱     ╲                          │
                        ╱  IN   ╲ NO                      │
                        ╲SCROLLING╱──────┐                │
                         ╲MODE  ╱        │                │
                          ╲    ╱         ▼                │
                           ╲  ╱        ╱S24╲              │
                          YES│         ╱    ╲ NO          │
                             │        ╱ POINTER╲──────────┤
                             │        ╲IN CONTACT╱        │
                             │         ╲WITH    ╱         │
                             │          ╲FRAME ╱          │
                             │           ╲EDGE╱           │
                             │              │ YES         │
                             │              ▼             │
                             │       ┌──────────────┐     │
                             │       │SWITCH POINTER│~S27 │
                             │       │   DISPLAY    │     │
                             │       └──────┬───────┘     │
                             │              │             ▼
                             │              │       ┌──────────┐
                             │              │       │ DISPLAY  │~S28
                             │              │       │ NORMAL   │
                             │              │       │ POINTER  │
                             │              │       └──────────┘
                             ▼              ▼            │
                          ╱S25╲            (2)           │
                         ╱SWITCH╲                        │
         RIGHT/LEFTWARD ╱POINTER ╲ BACKWARD DIRECTION    │
        ─DIRECTION─────╲DISPLAY ╱──SLIDING──────────────▶┤
         SLIDING        ╲  ?   ╱                         │
                         ╲    ╱                          │
                          ╲  ╱                           │
                   FORWARD │                             │
                   DIRECTION SLIDING                     │
                             ▼                           │
                       ┌──────────┐                      │
                       │   LINE   │~S26                  │
                       │ SCROLLING│                      │
                       └────┬─────┘                      │
                           (3)                           │
```

PATTERN 1

PATTERN 2

|  | POINTER MOVEMENT FRAME | | | |
|---|---|---|---|---|
|  | X-Y COORDINATE-1 | X-Y COORDINATE-2 | MOVEMENT SPEED | WAIT TIME |
| PATTERN 1 | 5,10 | 165,100 | 10 | 10 |
| PATTERN 2 | 5,10 | 165,180 | 20 | 10 |
| PATTERN 3 | 5,10 | 165,180 | 20 | 5 |

CELLULAR TELEPHONE

FIELD OF THE INVENTION

The present invention relates to a cellular telephone and, more particularly, to a cellular telephone provided with a pointing device.

BACKGROUND OF THE INVENTION

Operationality in inputting, displaying, outputting and processing information is a main factor to decide the utility value of a cellular telephone. Accordingly, cellular telephones with pointing devices have been developed in recent years. The pointing device is an input unit used for specifying the cursor position on the display to input characters or control the cellular telephone. It is required to improve the operationality or usability of the pointing device while aiming at smaller and lighter cellular telephones.

There is found an example of equipment having the pointing device in Japanese Patent Application laid open No. HEI9-134248, "Pointing input unit and electronic equipment provided with the same". In accordance with the prior art, a tabular operation button is slidably supported on the equipment so that plural processing objects can be handled by manipulating the button with a finger. In other words, a user can operate the equipment without shifting the operating position of his/her finger widely since it is unnecessary to use plural operation keys and buttons. Thus, the enhancement of operationality and the miniaturization of equipment can be achieved.

Besides, Japanese Patent Application laid open No. HEI9-282091 discloses a pointing device, in which a user can easily operate operation buttons by his/her thumb that works smoothly with forefinger while controlling the pointer position by the forefinger of his/her dominant hand.

However, there are some problems in the application of the above-mentioned pointing device to cellular telephones. First, the conventional pointing device does not have a function for facilitating line scrolling and page scrolling which are highly used on cellular telephones to select an item from a list or the like. Second, the moving speed of the pointer is too fast for the small screen of a cellular telephone.

SUMMARY OF THE INVENTION

It is therefore an object of the present invention to provide a cellular telephone with a pointing device in which line scrolling and page scrolling can be performed easily and the moving speed of the pointer can be controlled with respect to each on-screen display.

In accordance with the first aspect of the present invention, to achieve the above object, there is provided a cellular telephone with a pointing device which includes a pointer-operating button having a range of sliding movement in a prescribed plane, wherein the pointer-operating button can be pressed down and slide within the range of sliding movement by single finger operation, and a pointing function is accomplished by sliding/pressing the pointer-operating button.

In accordance with the second aspect of the present invention, in the first aspect, the pointer-operating button is located in the center of the range of sliding movement when not being operated.

In accordance with the third aspect of the present invention, in the second aspect, the pointer-operating button returns to the center position when released in sliding operation, and returns to its former condition when released from the pressed state in pressing operation.

In accordance with the fourth aspect of the present invention, in one of the first to third aspects, the range of sliding movement forms a pointer movement frame, a switch to line scrolling mode or page scrolling mode is made by bringing a pointer into contact with the top edge or the bottom edge of the pointer movement frame, and accordingly, the pointer converts into a line/page scrolling pointer.

In accordance with the fifth aspect of the present invention, in the fourth aspect, the moving speed of the pointer can be controlled with respect to each on-screen display.

In accordance with the sixth aspect of the present invention, in one of the first to fifth aspects, the cellular telephone is provided with a calculating means for finding out the destination of the pointer according to the angle of movement of the pointer-operating button in 360 degrees and the slant distance from the center of the range of sliding movement to the current location of the pointer-operating button.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, a description of preferred embodiments of the present invention will be given in detail.

Figure 1:
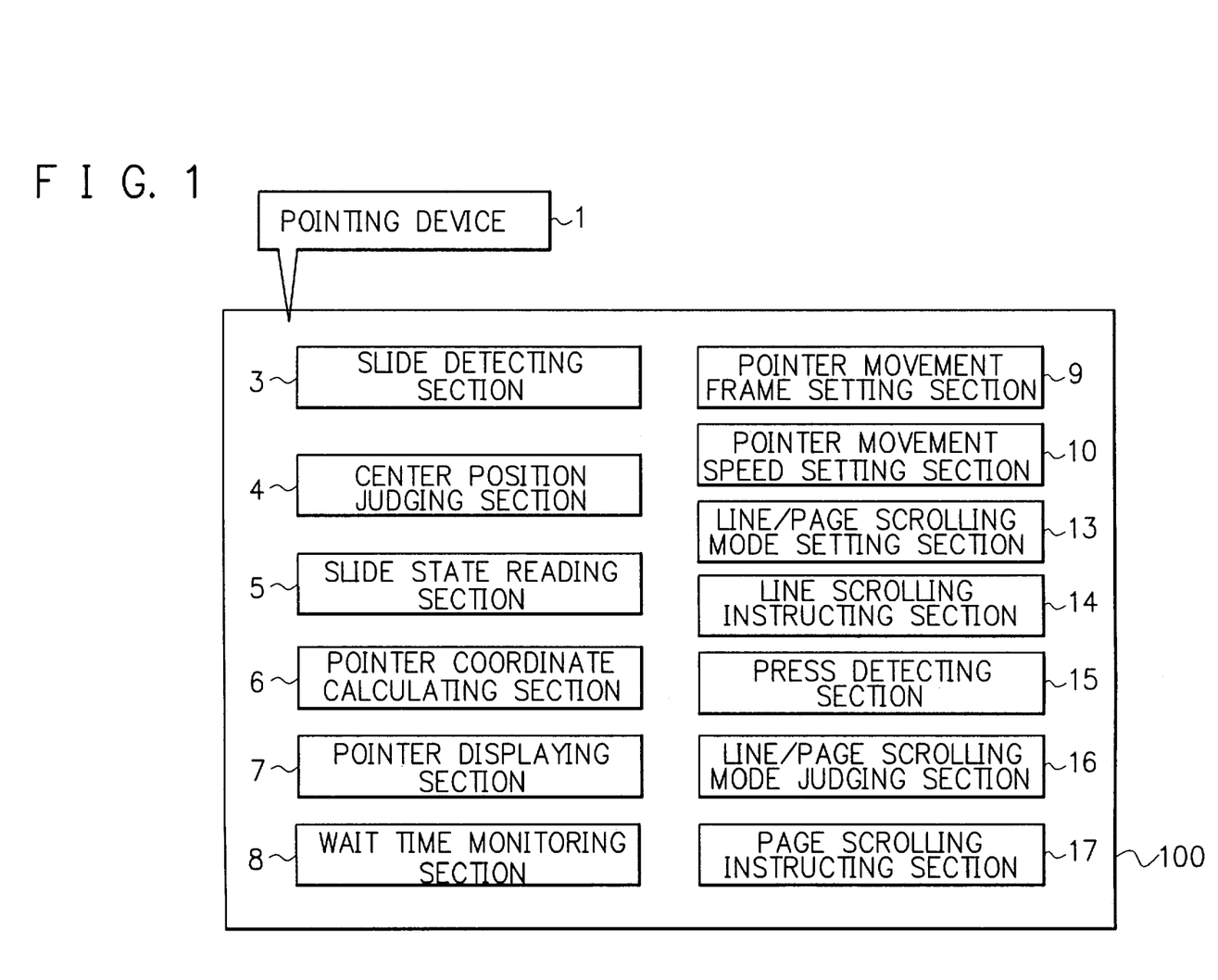
FIG. 1 is a diagram schematically showing the configuration of a cellular telephone according to the first embodiment of the present invention.

FIG. 1 is a diagram schematically showing the configuration of a cellular telephone according to the first embodiment of the present invention. The cellular telephone 100 in this embodiment is provided with a pointing device 1, and characterized in that plural processing objects can be handled by operating one button with a finger without using plural keys.

As can be seen in FIG. 1, the cellular telephone 100 comprises a slide detecting section 3, a center position judging section 4, a slide state reading section 5, a pointer coordinate calculating section 6, a pointer displaying section 7, a wait time monitoring section 8, a pointer movement frame setting section 9, a pointer movement speed setting section 10, a line/page scrolling mode setting section 13, a line scrolling instructing section 14, a press detecting section 15, a line/page scrolling mode judging section 16, and a page scrolling instructing section 17.

Figure 2:
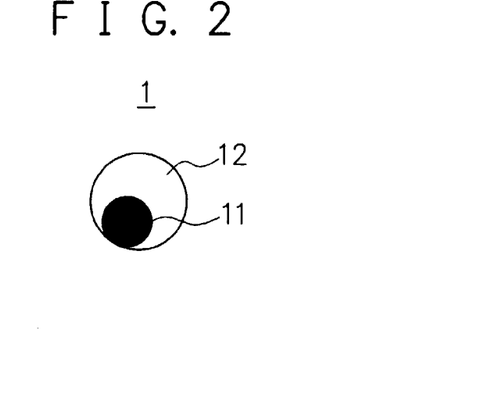
FIG. 2 is a diagram schematically showing the configuration of a pointing device applied to the cellular telephone depicted in FIG. 1.

FIG. 2 is a diagram schematically showing the configuration of the pointing device 1 applied to the cellular telephone 100.

Referring to FIG. 2, the pointing device 1 includes a pointer-operating button 11 having a sliding movement range 12. The pointer-operating button 11 is located in the center of the sliding movement range 12 when not being operated. The pointer-operating button 11 can be pressed down and also slide within the sliding movement range 12 by single finger operation. When taking a finger off the pointer-operating button 11 in sliding operation, it returns to the center position. On the other hand, when taking a finger off the pointer-operating button 11 being pressed in pressing operation, it returns to its former condition.

The pointing device 1 may be arranged in any position on the cellular telephone 100 as long as it can be easily used in the position. Besides, the sizes of the pointer-operating button 11 and sliding movement range 12 are unspecified. In regard to size, the pointer-operating button 11 and sliding movement range 12 are only required to be balanced with the cellular telephone 100.

In the following, a description will be given of the function of each section.

The slide detecting section 3 detects that the pointer-operating button 11 goes off from the center of the sliding movement range 12. The slide detecting section 3 also detects that the pointer-operating button 11 returns to the center position. After the detection, the slide detecting section 3 calls the center position judging section 4.

The center position judging section 4 that is called by the slide detecting section 3 or the wait time monitoring section 8 judges whether or not the pointer-operating button 11 is out of the center of the sliding movement range 12 based on the information output from the slide detecting section 3. When judging that the pointer-operating button 11 is out of the center of the sliding movement range 12, the center position judging section 4 calls the slide state reading section 5. When judging that the pointer-operating button 11 is in the center of the sliding movement range 12, the center position judging section 4 processes nothing, and terminates the operation.

The slide state reading section 5 reads sliding distance. More specifically, the slide state reading section 5 reads how match and at which angle the pointer-operating button 11 has sled in the sliding movement range 12. The sliding distance is necessary information for calculating coordinates used to move a pointer from the current display position or values for finding out the moving distance and destination of the pointer corresponding to the angle of movement of the pointer-operating button 11 in 360 degrees and the slant distance from the center of the sliding movement range 12 to the current location of the pointer-operating button 11.

The pointer coordinate calculating section 6 calculates coordinates for moving pointer display from the current position based on the sliding distance read by the slide state reading section 5. The pointer coordinate calculating section 6 also determines the shape of the pointer. The moving distance of the pointer is determined based on the slant distance from the center of the sliding movement range 12 to the position where the pointer-operating button 11 has moved. That is, the moving distance of the pointer is increased as the slant distance becomes longer.

The pointer displaying section 7 displays the pointer according to the coordinates and pointer shape determined by the pointer coordinate calculating section 6. The pointer displaying section 7 also changes pointer display according to an instruction from the line/page scrolling mode judging section 16. Besides, the pointer displaying section 7 deletes the former pointer that has been displayed on the screen of the cellular telephone 100.

The wait time monitoring section 8 waits a predetermined period of wait time for reading the sliding distance again.

The pointer movement frame setting section 9 presets a pointer movement frame, namely, sets the coordinates of the moving range of the pointer to limit the range of the pointer's movement.

The pointer movement speed setting section 10 sets a coefficient of the moving speed of the pointer. The coefficient of the moving speed is a factor to determine the moving distance of the pointer corresponding to the slant distance from the center of the sliding movement range 12 to the position where the pointer-operating button 11 has moved, which is calculated based on the sliding distance. The setting value is used by the pointer coordinate calculating section 6. The pointer movement speed setting section 10 also sets the wait time used by the wait time monitoring section 8.

The line/page scrolling mode setting section 13 sets the line/page scrolling mode effective or ineffective. When setting the line/page scrolling mode effective, the line/page scrolling mode setting section 13 calls the line/page scrolling mode judging section 16. On the other hand, when setting the line/page scrolling mode ineffective, the line/page scrolling mode setting section 13 calls the pointer displaying section 7 to display a normal pointer. The setting is referred to by the pointer coordinate calculating section 6.

Incidentally, when the line/page scrolling mode is effective, the cellular telephone 100 enters the line/page scrolling mode by, for example, bringing the pointer into contact with the top edge or the bottom edge of the pointer movement frame, and the pointer converts into a line/page scrolling pointer. Besides, when sliding the pointer-operating button 11 upward or downward in the page scrolling mode, page scrolling may be switched to line scrolling.

The line scrolling instructing section 14 gives an instruction to perform line scrolling.

The press detecting section 15 detects that the pointer-operating button 11 is pressed, and calls the line/page scrolling mode judging section 16.

The line/page scrolling mode judging section 16 judges whether or not the cellular telephone 100 is in the line/page scrolling mode. When determining that the cellular telephone 100 is in the line/page scrolling mode, the line/page scrolling mode judging section 16 calls the page scrolling instructing section 17. In addition, the line/page scrolling mode judging section 16 controls pointer switching operation, and instructs the pointer displaying section 7 on pointer display. For example, in the case where the pointer-operating button 11 slides in leftward/rightward directions in the page scrolling mode, the line/page scrolling mode judging section 16 calls the pointer displaying section 7 to change an upward page scrolling pointer to downward one or vice versa. In the case where the pointer-operating button 11 slides in a forward direction (downward direction when the pointer indicates downward page scrolling/upward direction when the pointer indicates upward page scrolling) in the page scrolling mode, the line/page scrolling mode judging section 16 calls the line scrolling instructing section 14 and wait time monitoring section 8. In the case where the pointer-operating button 11 slides in a backward direction (upward direction when the pointer indicates downward page scrolling/downward direction when the pointer indicates upward page scrolling) in the page scrolling mode, the cellular telephone 100 exits from the line/page scrolling mode, and the line/page scrolling mode judging section 16 calls the pointer displaying section 7 to display the normal pointer. In addition, when the cellular telephone 100 is not in the line/page scrolling mode, the line/page scrolling mode judging section 16 checks if the pointer is in contact with the top/bottom edge of the pointer movement frame. When the pointer is in contact with the top/bottom edge of the pointer movement frame, the cellular telephone 100 enters the line/page scrolling mode, and the line/page scrolling mode judging section 16 calls the pointer displaying section 7 to display a line/page scrolling pointer (upward/downward page scrolling pointers). On the other hand, when the pointer is not in contact with the top/bottom edge of the frame, the line/page scrolling mode judging section 16 calls the pointer displaying section 7 to display the normal pointer.

The page scrolling instructing section 17 gives an instruction to perform page scrolling.

As described above, the pointer movement frame setting section 9 sets the pointer movement frame, and the pointer moves within the movement frame. In addition, the pointer movement speed setting section 10 sets a coefficient of the pointer movement speed based on the size of the movement frame, etc. Besides, line/page scrolling is handled by the line/page scrolling mode judging section 16. Thus, with the use of the pointing device 1, it is possible to facilitate the operation of the cellular telephone 100 having a small screen by the pointer.

Incidentally, the cellular telephone 100 except for the pointing device 1 operates under program control.

Next, a description will be given of an example of pointer display switching operation and the shape of the pointer.

Figure 6:
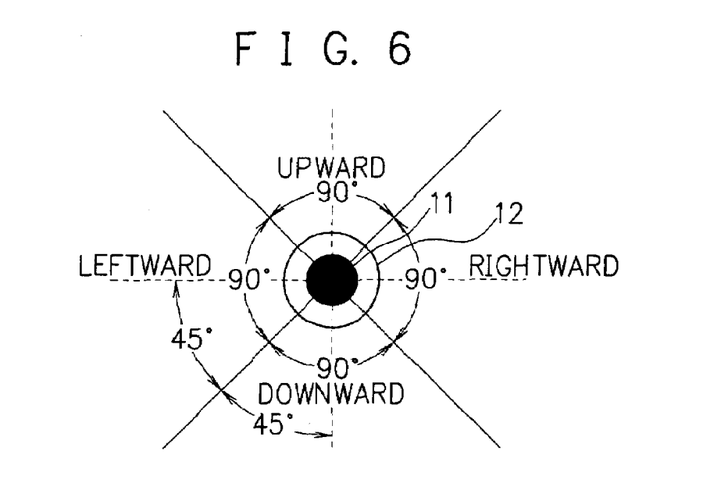
FIG. 6 is a diagram illustrating an example of the definition of four (upward, downward, rightward and leftward) directions with respect to the sliding movement of a pointer-operating button.

For example, the line/page scrolling pointer consists of two arrows, an upward arrow and a downward arrow, shaped like "△▽". The normal pointer may be an arrow pointer (⇨) commonly used on the screen of PC. The normal pointer is switched to the line/page scrolling pointer by moving the normal pointer to the top/bottom edge of the pointer movement frame. Immediately after the switch of pointers, the line/page scrolling pointer indicates "▲▽" at the top edge, or "△▼" at the bottom edge. In the case where the pointer-operating button 11 is pressed while the line/page scrolling pointer is indicating "▲▽", text or a document is scrolled by one screenful of lines so as to display the former part (previous page) of the text. On the other hand, when the pointer-operating button 11 is pressed while the line/page scrolling pointer is indicating "△▼", text is scrolled by one screenful of lines so as to display the latter part (next page) of the text. The line/page scrolling pointer "△▼" is switched to "▲▽" by sliding the pointer-operating button 11 in a leftward direction. The line/page scrolling pointer "▲▽" is switched to "△▼" by sliding the pointer-operating button 11 in a rightward direction. FIG. 6 shows a definition of four (upward, downward, rightward and leftward) directions with respect to the sliding movement of the pointer-operating button 11.

In the following, the operation of the cellular telephone 100 in this embodiment will be explained with reference to FIGS. 3 and 4.

Figure 3:
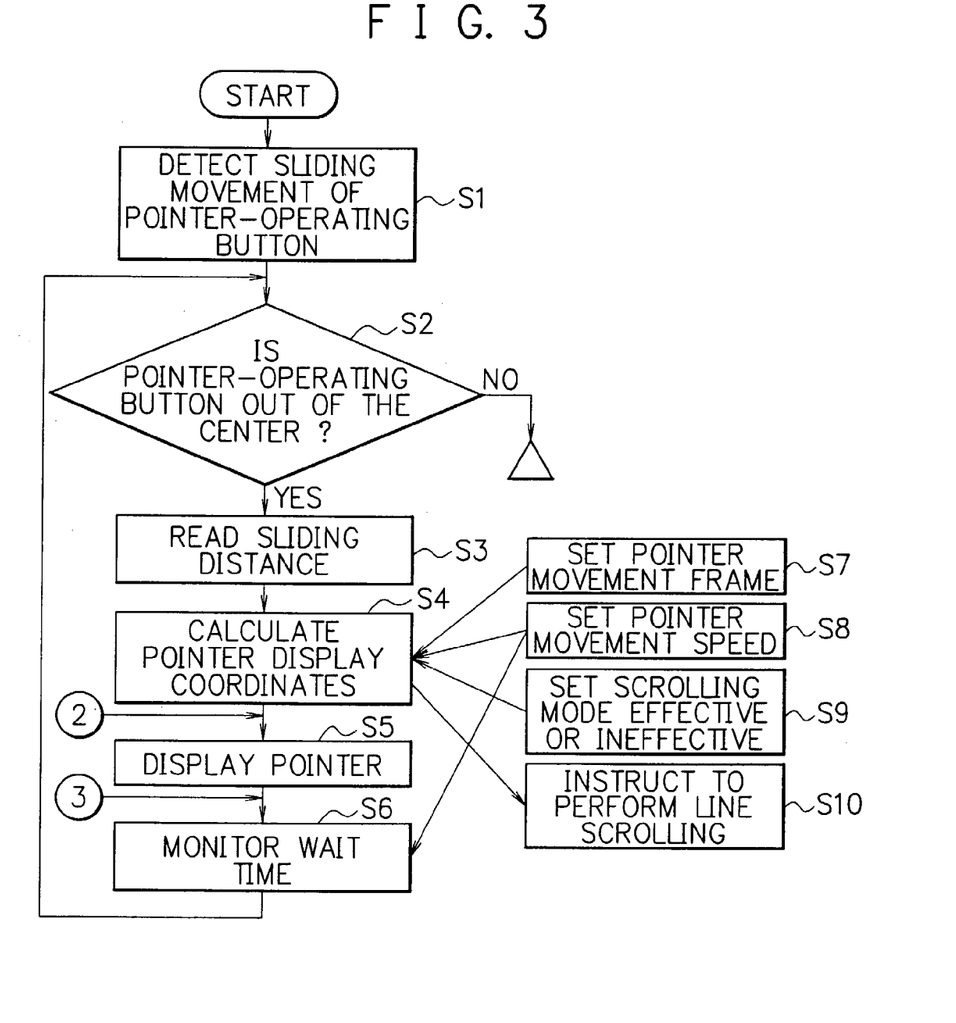
FIG. 3 is a flowchart for explaining the operation of the cellular telephone when using the pointing device.

FIG. 3 is a flowchart for explaining the operation of the cellular telephone 100 when sliding the pointer-operating button 11. When the pointer-operating button 11 slides, the slide detecting section 3 detects that the pointer-operating button 11 goes off from the center of the sliding movement range 12 (step S1), and calls the center position judging section 4.

The center position judging section 4 determines that the pointer-operating button 11 is out of the center of the sliding movement range 12 (step S2, YES), and calls the slide state reading section 5.

The slide state reading section 5 reads the sliding distance (step S3), and calls the pointer coordinate calculating section 6.

Subsequently, the pointer coordinate calculating section 6 calculates the coordinates of pointer display position to which the pointer is moved from the current position (step S4). In addition, the pointer coordinate calculating section 6 determines the shape of the pointer, and calls the pointer displaying section 7. At this point, the pointer coordinate calculating section 6 gives information on the calculated coordinates and determined pointer shape to the pointer displaying section 7.

Incidentally, the pointer coordinate calculating section 6 calculates the coordinates by using information on the pointer movement frame and movement speed preset by the pointer movement frame setting section 9 and the pointer movement speed setting section 10, respectively.

The pointer displaying section 7 displays the normal pointer based on the coordinates of the pointer display position (step S5), and deletes the former pointer that has been displayed on the screen. Then, the pointer displaying section 7 calls the wait time monitoring section 8.

The wait time monitoring section 8 counts the wait time preset by the pointer movement speed setting section 10, and calls the center position judging section 4 (step S6).

The pointer movement frame setting section 9 and the pointer movement speed setting section 10 preset the pointer movement frame and the coefficient of pointer movement speed, respectively (step S7/step S8). The pointer movement speed setting section 10 also sets the wait time used by the wait time monitoring section 8 since the wait time has an influence on the pointer movement speed.

The line/page scrolling mode setting section 13 sets the line/page scrolling mode either effective or ineffective in advance (step S9). When the line/page scrolling mode is effective, the cellular telephone 100 enters the line/page scrolling mode by bringing the pointer into contact with the top edge or the bottom edge of the pointer movement frame. When sliding the pointer-operating button 11 in an upward or downward direction in the line/page scrolling mode, the line scrolling instructing section 14 issues an instruction to perform line scrolling (step S10).

Next, the operation of the cellular telephone 100 when pressing the pointer-operating button 11 will be explained with reference to FIG. 4.

Figure 4:
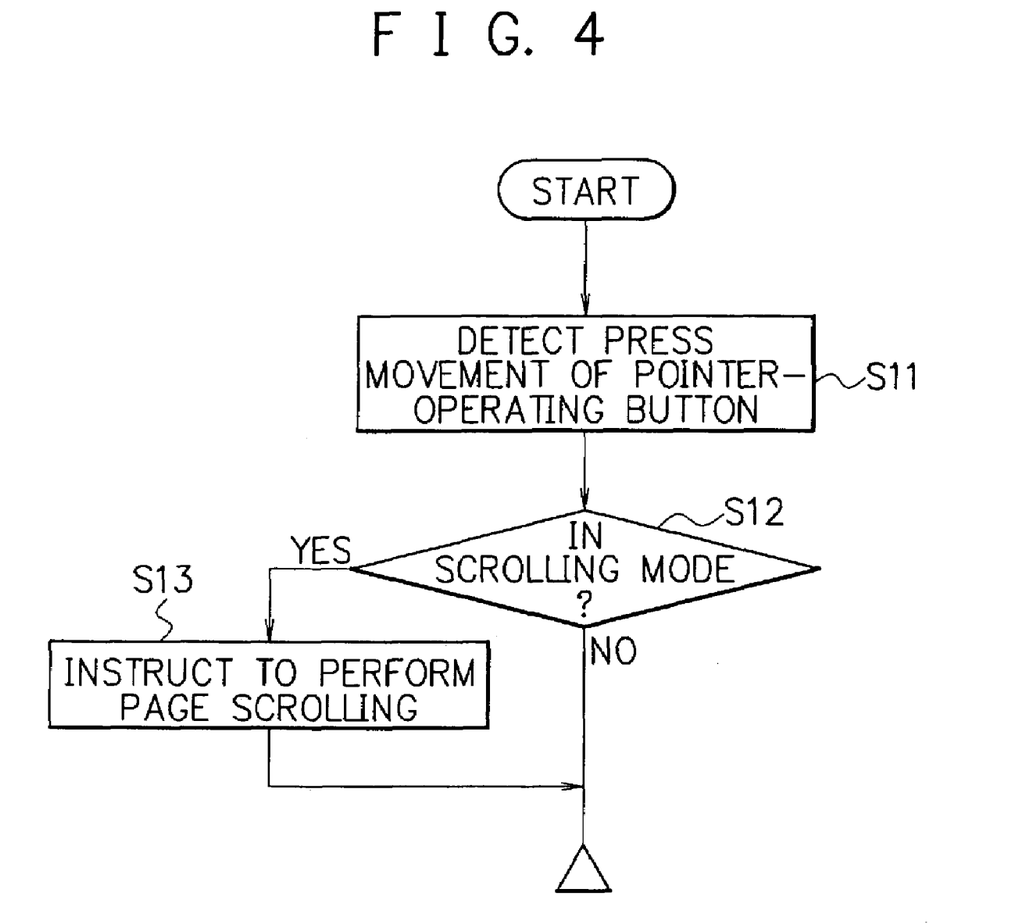
FIG. 4 is another flowchart for explaining the operation of the cellular telephone when using the pointing device.

FIG. 4 is a flowchart for explaining the operation of the cellular telephone 100 when pressing the pointer-operating button 11. The press detecting section 15 is activated by pressing the pointer-operating button 11, and detects that the pointer-operating button 11 is pressed (step S11). Subsequently, the press detecting section 15 calls the line/page scrolling mode judging section 16.

The line/page scrolling mode judging section 16 judges whether or not the cellular telephone 100 is in the line/page scrolling mode (step S12). When determining that the cellular telephone 100 is in the line/page scrolling mode (step S12, YES), the line/page scrolling mode judging section 16 calls the page scrolling instructing section 17. The page scrolling instructing section 17 issues an instruction to perform page scrolling (step S13).

In the following, a description will be given of the relationship between the sliding movement of the pointer-operating button 11 and pointer moving distance.

Figure 7:
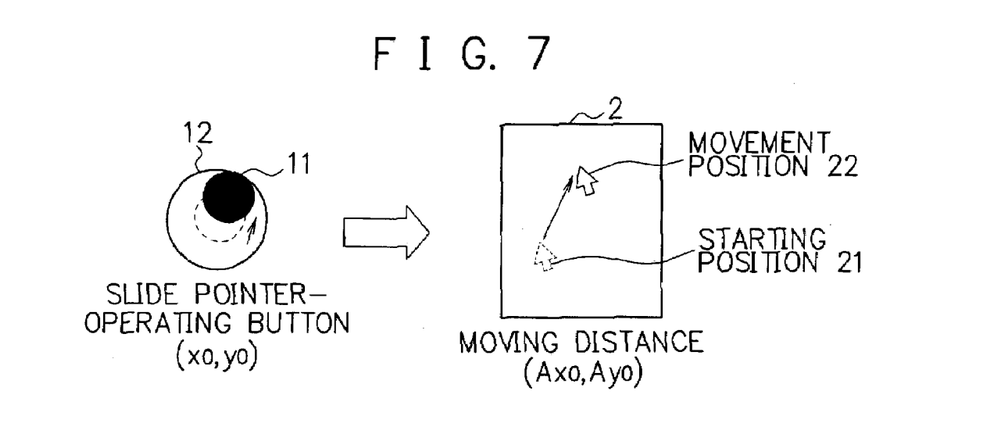
FIG. 7 is a diagram showing the pointing device and display section.

FIG. 7 is a diagram showing the sliding movement of the pointer-operating button 11 and the pointer displayed on a display section 2. A pointer 21 indicates a pointer starting position (origin) from which the pointer moves, while the pointer 22 indicates a pointer movement position (destination) to which the pointer moves when sliding the pointer-operating button 11. In FIG. 7, the pointer-operating button 11 fully slides in the sliding movement range 12 at an angle [x0, y0], and the pointer moves from the pointer starting position 21 to the pointer movement position 22 at [Ax0, Ay0].

Figure 8:
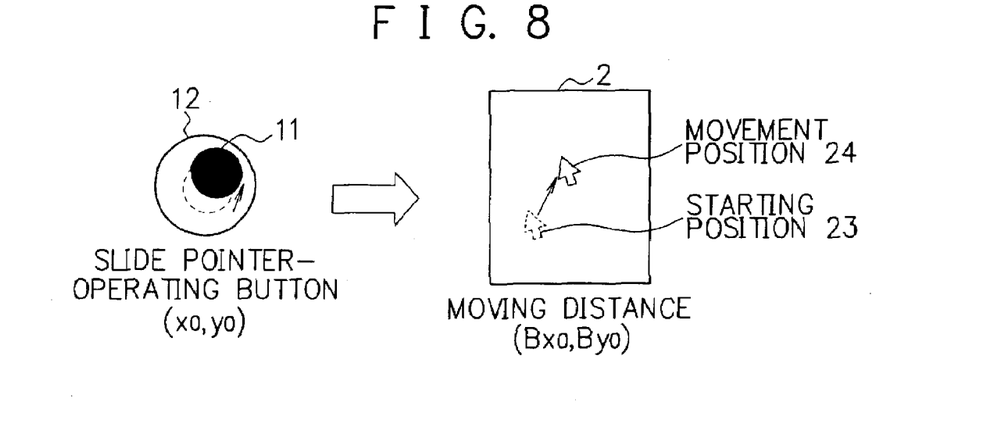
FIG. 8 is another diagram showing the pointing device and display section.

FIG. 8 is another diagram showing the sliding movement of the pointer-operating button 11 and the pointer displayed on the display section 2. In FIG. 8, the pointer-operating button 11 slides partway in the sliding movement range 12 at an angle [x0, y0] differently from the case of FIG. 7, and the pointer moves from the pointer starting position 23 to the pointer movement position 24 at [Bx0, By0]).

As can be seen in FIGS. 7 and 8, the moving distance of the pointer (the distance between the pointer starting position and pointer movement position) is increased as the slant distance from the center of the sliding movement range 12 to the position where the pointer-operating button 11 has moved becomes longer. Besides, the pointer movement speed increases as the slant distance becomes longer.

Figure 9:
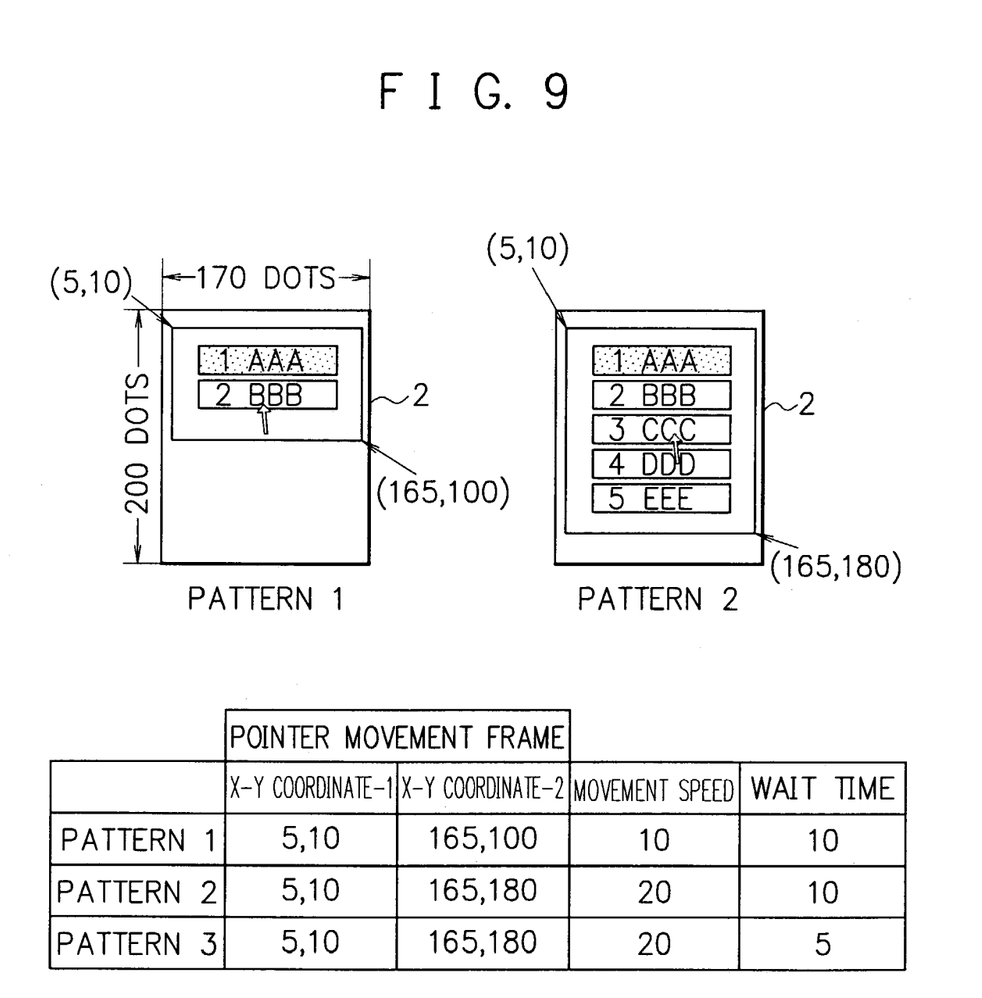
FIG. 9 is a diagram for explaining the settings of pointer movement frame and pointer movement speed.

Next, the settings of the pointer movement frame and pointer movement speed will be explained with reference to FIG. 9. FIG. 9 is a diagram showing two types of display (pattern 1 and pattern 2) on the display section 2, and a table of the settings of the pointer movement frame, pointer movement speed and wait time for each display. Incidentally, the settings for pattern 3 are added to the table for comparison.

Referring to the table shown in FIG. 9, the setting of the pointer movement frame includes X-Y coordinate 1 and X-Y coordinate 2. The setting values for the X-Y coordinates 1 and 2 are preset by the pointer movement frame setting section 9. The pointer movement frame is a square defined by the X-Y coordinates 1 and 2.

Besides, the coefficient of the pointer movement speed and wait time are set by the pointer movement speed setting section 10. The wait time is used by the wait time monitoring section 8.

In the case of the display pattern 1, the X-Y coordinates 1 and 2 for the pointer movement frame are set to [5, 10] and [165, 100], respectively, the coefficient of the pointer movement speed is set to "10", and the wait time is set to "10".

In the case of the display pattern 2, the X-Y coordinates 1 and 2 for the pointer movement frame are set to [5, 10] and [165, 180], respectively, the coefficient of the pointer movement speed is set to "20", and the wait time is set to "10".

The coefficient of the pointer movement speed is used by the pointer coordinate calculating section 6 for calculating the coordinates of pointer display position. The pointer movement speed increases as the coefficient becomes higher.

With regard to the wait time, the pointer coordinate calculating section 6 makes more calculations per unit of time as the wait time is set shorter. Accordingly, the shorter wait time increases the pointer moving distance per unit of time and the pointer movement speed. For example, comparing the pattern 3 with the pattern 2 in the table, only the setting values of the wait time are different from each other, the setting value of the pattern 3 being smaller than that of the pattern 2. Consequently, the pointer moves faster in the case of the pattern 3 as compared to the pattern 2.

As described previously in connection with FIGS. 7 and 8, the pointer movement speed increases as the slant distance from the center of the sliding movement range 12 to the position where the pointer-operating button 11 has moved becomes longer. Accordingly, it can be understood that the pointer coordinate calculating section 6 calculates the coordinates of pointer display position based on the slant distance and the coefficient of the pointer movement speed.

In the following, a description will be given of the line/page scrolling mode with reference to FIG. 5.

Figure 5:
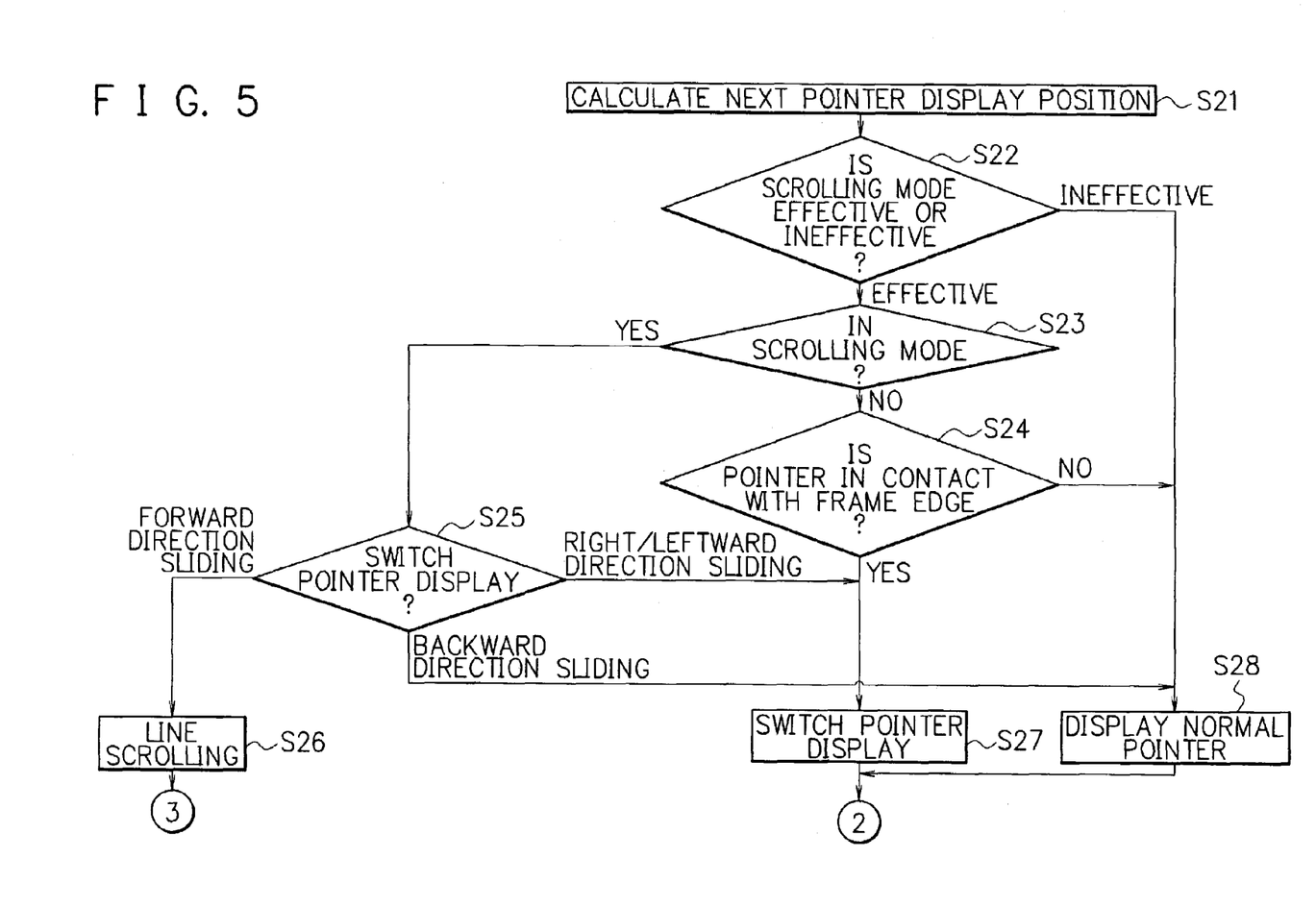
FIG. 5 is a flowchart for explaining an example of the operation of the cellular telephone in line/page scrolling mode.

FIG. 5 is a flowchart for explaining the operation of the cellular telephone 100 in the line/page scrolling mode. When called by the slide state reading section 5, the pointer coordinate calculating section 6 calculates the coordinates of the next pointer display position based on the sliding distance read by the slide state reading section 5 (step S21).

When the line/page scrolling mode is effective (step S22, effective), The line/page scrolling mode judging section 16 judges whether or not the cellular telephone 100 is in the line/page scrolling mode (step S23).

When determining that the cellular telephone 100 is not in the line/page scrolling mode (step S23, NO), the line/page scrolling mode judging section 16 checks if the pointer is in contact with the top/bottom edge of the pointer movement frame (step S24). When the pointer is in contact with the top/bottom edge of the pointer movement frame (step S24, YES), the line/page scrolling mode judging section 16 calls the pointer displaying section 7 to display the line/page scrolling pointer. On the other hand, when the pointer is not in contact with the top/bottom edge of the frame (step S24, NO), the line/page scrolling mode judging section 16 calls the pointer displaying section 7 to display the normal pointer.

When determining that the cellular telephone 100 is in the line/page scrolling mode (step S23, YES), the line/page scrolling mode judging section 16 judges whether or not to switch pointer display (step S25). In the case where the pointer-operating button 11 slides in leftward/rightward directions (step S25, right/leftward direction sliding), the line/page scrolling mode judging section 16 calls the pointer displaying section 7 to change an upward page scrolling pointer to downward one or vice versa. The pointer displaying section 7 switches pointer display (step S27). In the case where the pointer-operating button 11 slides in a forward direction (step S25, forward direction sliding), the line/page scrolling mode judging section 16 calls the line scrolling instructing section 14. The line scrolling instructing section 14 issues an instruction to perform line scrolling (step S26). In the case where the pointer-operating button 11 slides in a backward direction (step S25, backward direction sliding), the cellular telephone 100 exits from the line/page scrolling mode, and the line/page scrolling mode judging section 16 calls the pointer displaying section 7 to display the normal pointer. The pointer displaying section 7 displays the normal pointer (step S28).

In the following, a description will be given of the pointer switching operation with reference to FIG. 10.

Figure 10:
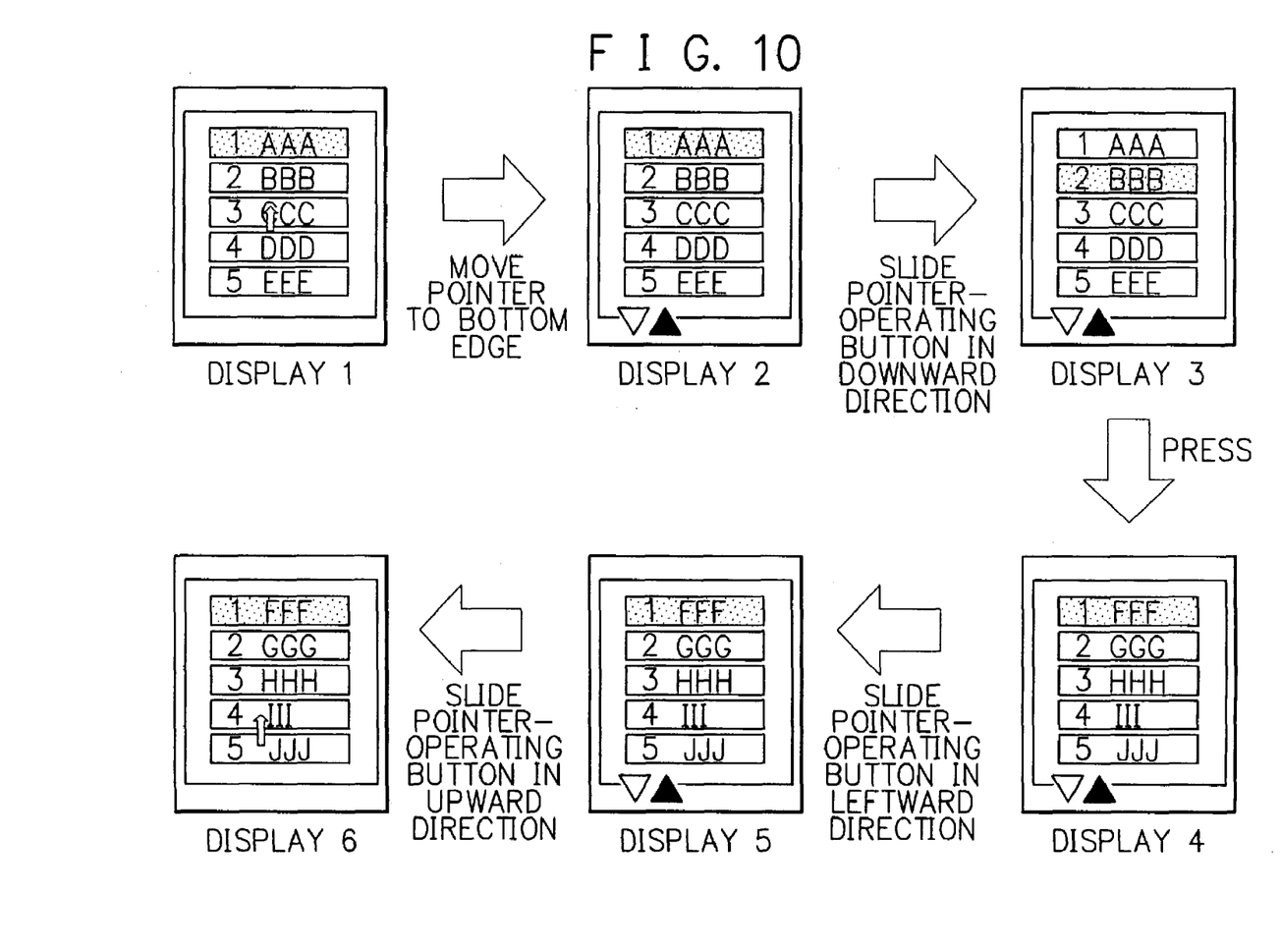
FIG. 10 is a diagram for explaining an example of the pointer switching operation.

FIG. 10 is a diagram for explaining changes in screen display on the display section 2 made by operating the pointer-operating button 11. In FIG. 10, it is assumed that the setting values of the pattern 2 in the table of FIG. 9 are preset for all example displays 1 to 6, and the line/page scrolling mode setting section 13 has set the line/page scrolling mode effective.

Display 1 shows the normal pointer and a list in which "1 AAA" is selected. When moving the normal pointer to the position at 180 on a Y-axis while the display 1 appears on the display section 2, the normal pointer changes to the line/page scrolling pointer as shown in display 2.

Further, when sliding the pointer-operating button 11 in a downward direction while the display 2 appears on the display section 2, the highlighted cursor is moved by one line, and the selected item is changed from "1 AAA" to "2 BBB" as shown in display 3.

When pressing the pointer-operating button 11 while the display 3 appears on the display section 2, the list is scrolled by one screenful of lines (by one page), and the latter part (next page) of the list is displayed on the display section 2 as shown in display 4. Incidentally, it is assumed that the next page of the list contains FFF to JJJ.

When sliding the pointer-operating button 11 in a leftward direction while the display 4 appears on the display section 2, the line/page scrolling pointer "∇▲" is switched to "▼Δ" as shown in FIG. 5.

When sliding the pointer-operating button 11 in an upward direction while the display 5 appears on the display section 2, the line/page scrolling pointer "▼Δ" is switched to the normal pointer as shown in display 6.

Next, a description will be given of the cellular telephone 100 according to the second embodiment of the present invention with reference to FIG. 11. The line/page scrolling pointer used in this embodiment is an upward arrow or a downward arrow differently from that used in the first embodiment.

Figure 11:
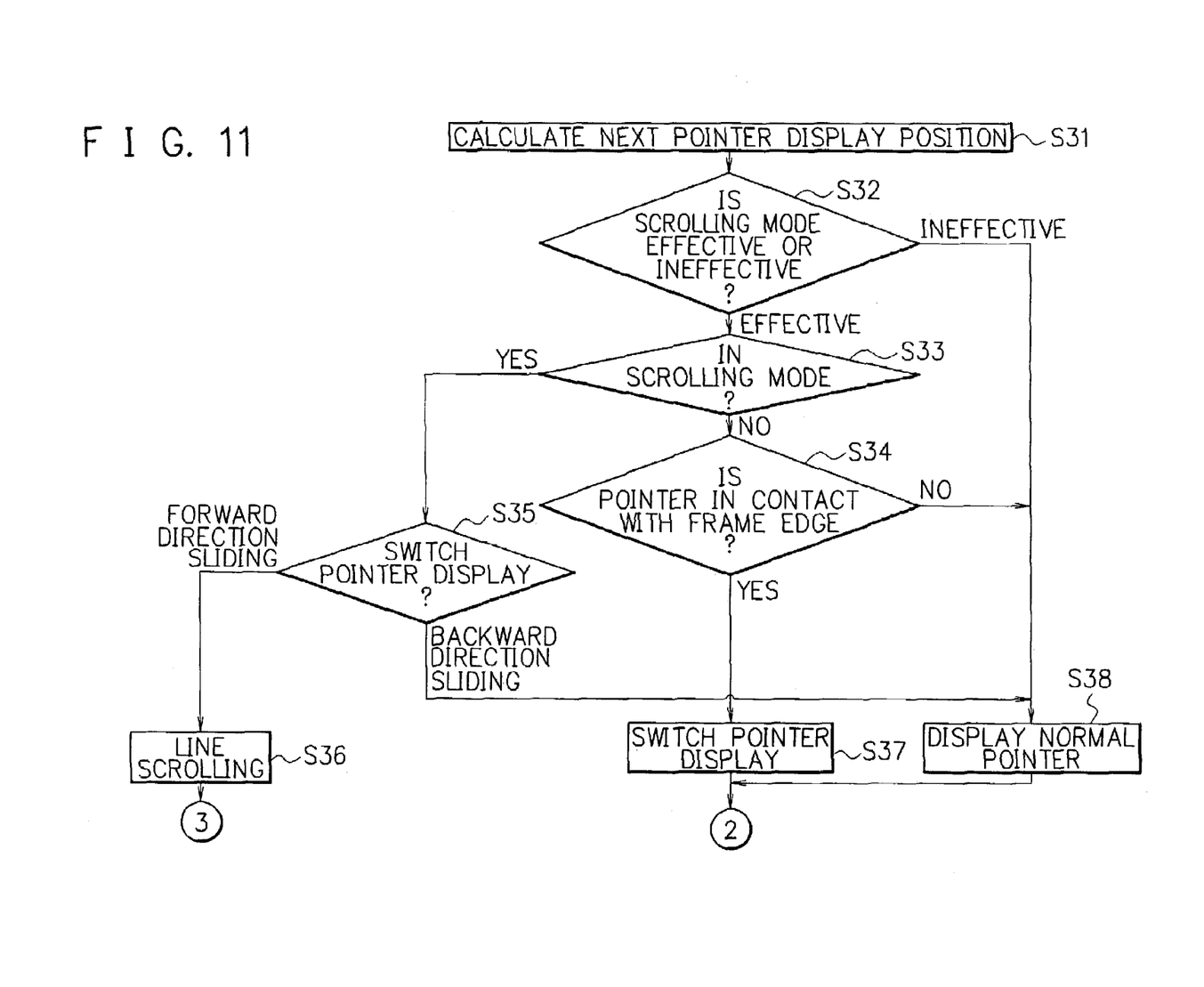
FIG. 11 is a flowchart for explaining another example of the operation of the cellular telephone in line/page scrolling mode.

FIG. 11 is a flowchart for explaining the operation of the cellular telephone 100 according to the second embodiment. The flowchart of FIG. 11 is similar to that of FIG. 5 except for the process at step S35. At step S35, there is no processing for the case where the pointer-operating button 11 slides in leftward/rightward directions differently from step S25 in FIG. 5.

As described above, the line/page scrolling pointer in the second embodiment consists of one arrow, for example, an upward arrow "Δ" or a downward arrow "∇". The normal pointer may be an arrow pointer or the like other than "ΔV", which indicates a direction such as "⇨ ". When moving the normal pointer to the top/bottom edge of the pointer movement frame, the normal pointer is switched to the line/page scrolling pointer. Immediately after the switch of pointers, the line/page scrolling pointer indicates "▲" at the top edge, or "▼" at the bottom edge. In the case where the pointer-operating button 11 is pressed while the line/page scrolling pointer is indicating "▲", text is scrolled by one page so as to display the previous page of the text. On the other hand, when the pointer-operating button 11 is pressed while the line/page scrolling pointer is indicating "▼", text is scrolled by one page so as to display the next page of the text.

In the following, the pointer switching operation in the second embodiment will be explained with reference to FIG. 12.

Figure 12:
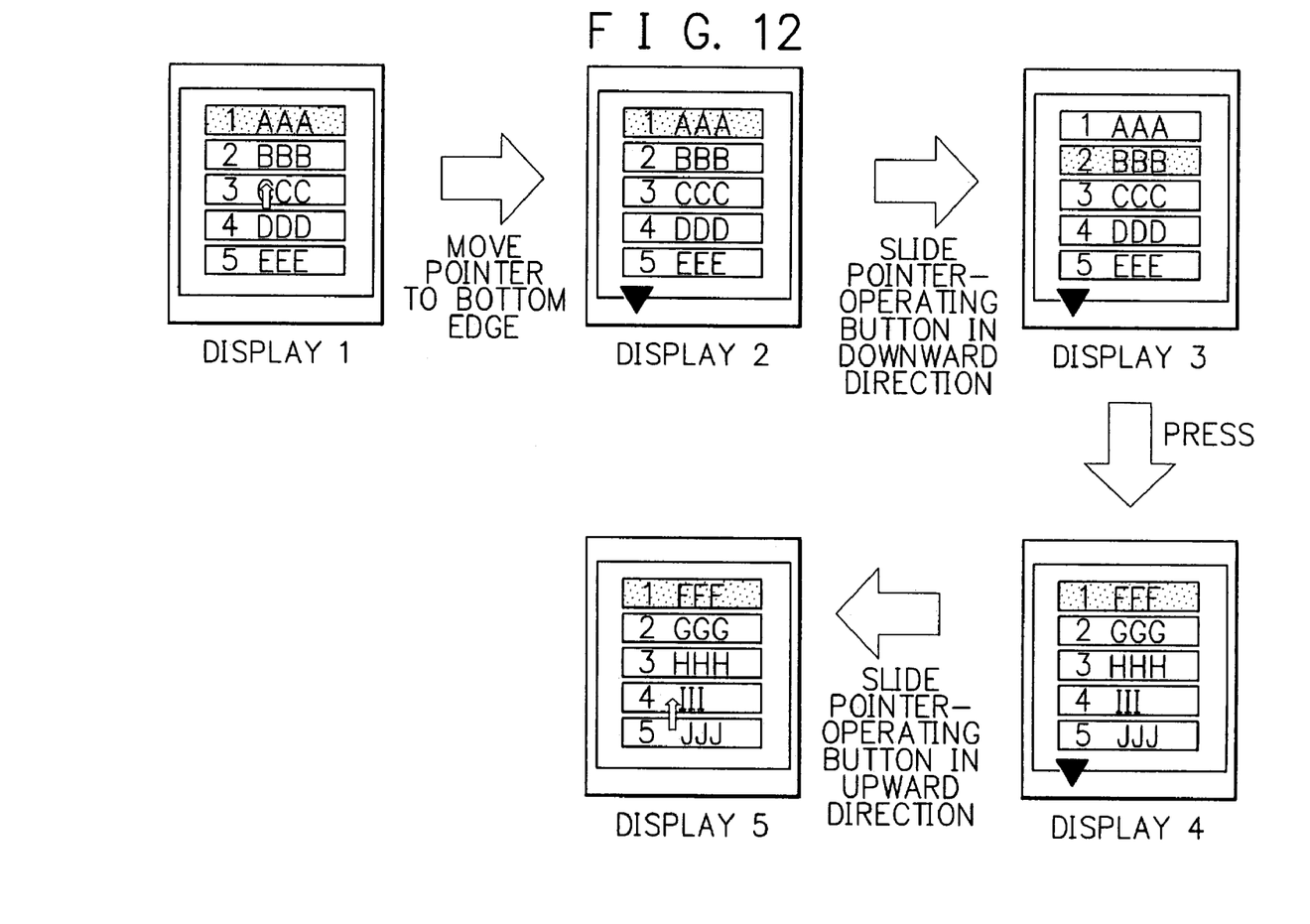
FIG. 12 is a diagram for explaining another example of the pointer switching operation.

FIG. 12 is a diagram for explaining changes in screen display on the display section 2 made by operating the pointer-operating button 11.

In FIG. 12, display 1 shows the normal pointer and a list in which "1 AAA" is selected. When moving the normal pointer to the position at 180 on a Y-axis while the display 1 appears on the display section 2, the normal pointer changes to the line/page scrolling pointer as shown in display 2.

Further, when sliding the pointer-operating button 11 in a downward direction while the display 2 appears on the display section 2, the highlighted cursor is moved by one line, and the selected item is changed from "1 AAA" to "2 BBB" as shown in display 3.

When pressing the pointer-operating button 11 while the display 3 appears on the display section 2, the list is scrolled by one page, and the next page of the list is displayed on the display section 2 as shown in display 4. Incidentally, it is assumed that the next page of the list contains FFF to JJJ.

When sliding the pointer-operating button 11 in an upward direction while the display 4 appears on the display section 2, the line/page scrolling pointer "▼" is switched to the normal pointer as shown in FIG. 5.

While the preferred embodiments of the present invention have been described using specific terms, such description is for illustrative purposes only, and it is to be understood that changes and variations may be made without departing from the spirit or the scope of the present invention.

Figure 13:
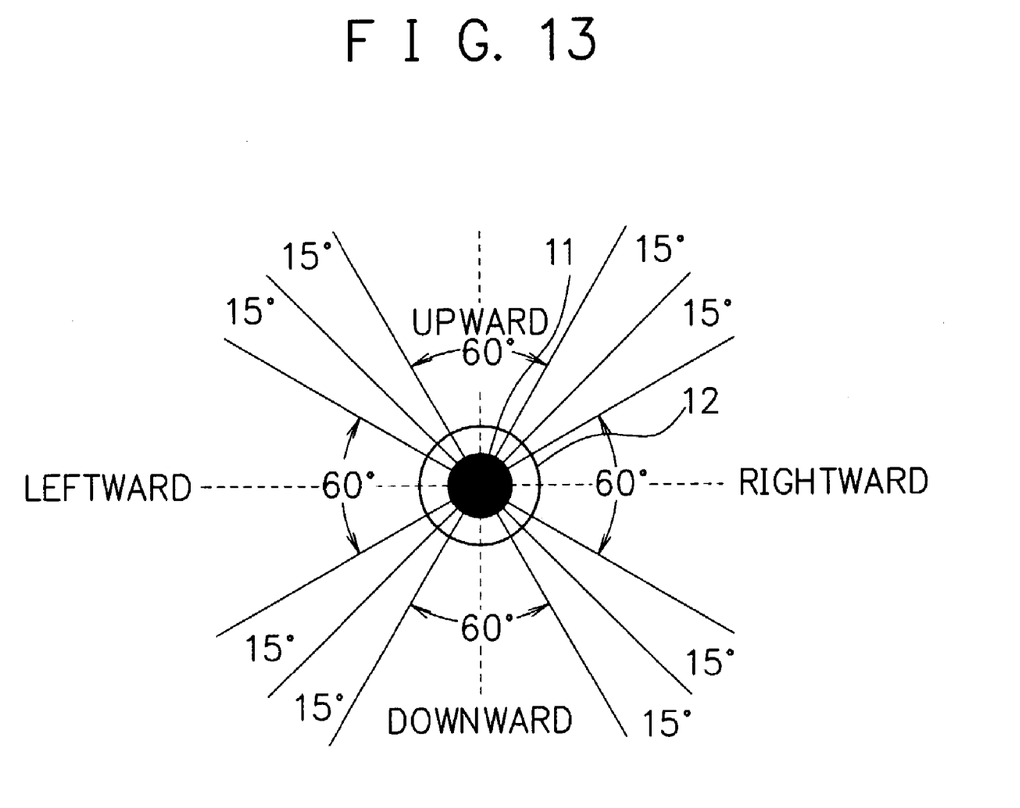
FIG. 13 is a diagram illustrating another example of the definition of four (upward, downward, rightward and leftward) directions with respect to the sliding movement of the pointer-operating button.

For example, a definition of four (upward, downward, rightward and leftward) directions with respect to the sliding movement of the pointer-operating button 11 is not limited to that shown in FIG. 6. While 360 degrees are divided by the four directions and each direction covers 90 degrees in FIG. 6, each direction may cover an angle of any degrees such as 60 degrees as shown in FIG. 13 as long as a user does not feel awkwardness in operating the pointer-operating button 11.

Besides, in the flowchart shown in FIG. 3, the center position judging section 4 judges the position of the pointer-operating button 11 once before the slide state reading section 5 reads the sliding distance of the pointer-operating button 11. However, the center position judging section 4 may judge the position more than once. For example, the center position judging section 4 may judge the position also before the calculating process by the pointer coordinate calculating section 6 so that the movement of the pointer can be stopped more timely when the pointer-operating button 11 returns to the center of the sliding movement range 12.

As set forth hereinabove, in accordance with the present invention, the cellular telephone includes a pointer-operating button as a pointing device for providing a pointing function, which can be pressed and also slid in the sliding movement range with a finger. With this construction, line scrolling and page scrolling can be performed by manipulating only the pointer-operating button without using plural keys, and the operationality of the cellular telephone can be improved.

Additionally, the pointer-operating button automatically returns to the center position when a user takes his/her finger off the button in sliding operation, and returns to its former condition when taking his/her finger off the pressed button in pressing operation, which facilitates the manipulation of the pointing device.

Moreover, a switch to the line scrolling mode or page scrolling mode is made by bringing a pointer into contact with the top/bottom edge of the pointer movement frame, and the pointer converts into a line/page scrolling pointer according to the modes. Consequently, a user can easily carry out line scrolling and page scrolling on the cellular telephone.

Furthermore, the moving speed of the pointer can be controlled with respect to each on-screen display. That is, the speed of pointer movement in the pointer movement frame can be set for each of different on-screen displays. Thus, it is possible to solve such problem that the moving speed of the pointer is too fast for the small screen of the cellular telephone.

Furthermore, the pointer movement position to which the pointer moves is determined based on the angle of movement of the pointer-operating button in 360 degrees and the slant distance from the center of the sliding movement range to the current location of the pointer-operating button, user can easily manipulates the pointer with the pointer-operating button.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. A cellular telephone comprising:
   a pointing device which includes a pointer-operating button having a range of sliding movement in a prescribed plane; and
   a display; wherein
   the pointer-operating button can be pressed down and slides within the range of sliding movement by single finger operation;
   sliding and/or pressing the pointer-operating button controls operation of a pointer on the display; and
   the telephone switches between a first scrolling mode and a second scrolling mode based on the location of the pointer on the display.

2. A cellular telephone according to claim 1, wherein the pointer-operating button is located in the center of the range of sliding movement when not being operated.

3. A cellular telephone according to claim 2, wherein the first scrolling mode is a line scrolling mode and the second scrolling mode is a page scrolling mode; and
   the pointer-operating button returns to the center position when released in sliding operation, and returns to a non-pressed stated when released from the pressed state in pressing operation.

4. A cellular telephone with a pointing device which includes a pointer-operating button having a range of sliding movement in a prescribed plane, wherein:
   the pointer-operating button can be pressed down and slide within the range of sliding movement by single finger operation;
   the pointing function of the pointing device is accomplished by sliding and/ or pressing the pointer-operating button;
   the range of sliding movement defines a pointer movement frame; and
   a switch to line scrolling mode or page scrolling mode is made by bringing a pointer into contact with the top edge or the bottom edge of the pointer movement frame.

5. A cellular telephone with a pointing device which includes a pointer-operating button having a range of sliding movement in a prescribed plane, wherein:
   the pointer-operating button can be pressed down and slide within the range of sliding movement by single finger operation;
   the pointing function of the pointing device is accomplished by sliding and/or pressing the pointer-operating button;
   the pointer-operating button is located in the center of the range of sliding movement when not being operated;
   the range of sliding movement defines a pointer movement frame;
   a switch to line scrolling mode or page scrolling mode is made by bringing a pointer into contact with the top edge or the bottom edge of the pointer movement frame; and
   the pointer converts into a line scrolling pointer or a page scrolling pointer according to the modes.

6. A cellular telephone with a pointing device which includes a pointer-operating button having a range of sliding movement in a prescribed plane, wherein:
   the pointer-operating button can be pressed down and slide within the range of sliding movement by single finger operation;
   the pointing function of the pointing device is accomplished by sliding and/ or pressing the pointer-operating button;
   the pointer-operating button is located in the center of the range of sliding movement when not being operated;
   the pointer-operating button returns to the center position when released in sliding operation, and returns to a non-pressed stated when released from the pressed state in pressing operation;
   the range of sliding movement defines a pointer movement frame;
   a switch to line scrolling mode or page scrolling mode is made by bringing a pointer into contact with the top edge or the bottom edge of the pointer movement frame; and
   the pointer converts into a line scrolling pointer or a page scrolling pointer according to the modes.

7. A cellular telephone with a pointing device which includes a pointer-operating button having a range of sliding movement in a prescribed plane, wherein:
   the pointer-operating button can be pressed down and slide within the range of sliding movement by single finger operation;
   the pointing function of the pointing device is accomplished by sliding and/ or pressing the pointer-operating button;
   the range of sliding movement defines a pointer movement frame;
   a switch to line scrolling mode or page scrolling mode is made by bringing a pointer into contact with the top edge or the bottom edge of the pointer movement frame;
   the pointer converts into a line scrolling pointer or a page scrolling pointer according to the modes; and
   the moving speed of the pointer can be controlled with respect to each on-screen display.

8. A cellular telephone with a pointing device which includes a pointer-operating button having a range of sliding movement in a prescribed plane, wherein:
   the pointer-operating button can be pressed down and slide within the range of sliding movement by single finger operation;

the pointing function of the pointing device is accomplished by sliding and/ or pressing the pointer-operating button;

the pointer-operating button is located in the center of the range of sliding movement when not being operated;

the range of sliding movement defines a pointer movement frame;

a switch to line scrolling mode or page scrolling mode is made by bringing a pointer into contact with the top edge or the bottom edge of the pointer movement frame;

the pointer converts into a line scrolling pointer or a page scrolling pointer according to the modes; and the moving speed of the pointer can be controlled with respect to each on-screen display.

9. A cellular telephone with a pointing device which includes a pointer-operating button having a range of sliding movement in a prescribed plane, wherein:

the pointer-operating button can be pressed down and slide within the range of sliding movement by single finger operation;

the pointing function of the pointing device is accomplished by sliding and/ or pressing the pointer-operating button;

the pointer-operating button is located in the center of the range of sliding movement when not being operated;

the pointer-operating button returns to the center position when released in sliding operation, and returns to a non-pressed stated when released from the pressed state in pressing operation;

the range of sliding movement defines a pointer movement frame;

a switch to line scrolling mode or page scrolling mode is made by bringing a pointer into contact with the top edge or the bottom edge of the pointer movement frame;

the pointer converts into a line scrolling pointer or a page scrolling pointer according to the modes; and the moving speed of the pointer can be controlled with respect to each on-screen display.

10. The cellular telephone claimed in claim 1, provided with a calculating means for calculating the destination of the pointer corresponding to the angle of movement of the pointer-operating button in 360 degrees and the slant distance from the center of the range of sliding movement to the current location of the pointer-operating button.

11. The cellular telephone claimed in claim 2, provided with a calculating means for calculating the destination of the pointer corresponding to the angle of movement of the pointer-operating button in 360 degrees and the slant distance from the center of the range of sliding movement to the current location of the pointer-operating button.

12. The cellular telephone claimed in claim 3, provided with a calculating means for calculating the destination of the pointer corresponding to the angle of movement of the pointer-operating button in 360 degrees and the slant distance from the center of the range of sliding movement to the current location of the pointer-operating button.

13. The cellular telephone claimed in claim 4, provided with a calculating means for calculating the destination of the pointer corresponding to the angle of movement of the pointer-operating button in 360 degrees and the slant distance from the center of the range of sliding movement to the current location of the pointer-operating button.

14. The cellular telephone claimed in claim 5, provided with a calculating means for calculating the destination of the pointer corresponding to the angle of movement of the pointer-operating button in 360 degrees and the slant distance from the center of the range of sliding movement to the current location of the pointer-operating button.

15. The cellular telephone claimed in claim 6, provided with a calculating means for calculating the destination of the pointer corresponding to the angle of movement of the pointer-operating button in 360 degrees and the slant distance from the center of the range of sliding movement to the current location of the pointer-operating button.

16. The cellular telephone claimed in claim 7, provided with a calculating means for calculating the destination of the pointer corresponding to the angle of movement of the pointer-operating button in 360 degrees and the slant distance from the center of the range of sliding movement to the current location of the pointer-operating button.

17. The cellular telephone claimed in claim 8, provided with a calculating means for calculating the destination of the pointer corresponding to the angle of movement of the pointer-operating button in 360 degrees and the slant distance from the center of the range of sliding movement to the current location of the pointer-operating button.

18. The cellular telephone claimed in claim 9, provided with a calculating means for calculating the destination of the pointer corresponding to the angle of movement of the pointer-operating button in 360 degrees and the slant distance from the center of the range of sliding movement to the current location of the pointer-operating button.

19. The cellular telephone claimed in claim 4, wherein the pointer converts into a line scrolling pointer or a page scrolling pointer according to the modes.

20. A cellular telephone comprising:

a pointer button that slides and can be depressed;

a display on which a pointer is displayed;

wherein the pointer button controls movement of the pointer on the display; and wherein the cellular telephone switches between a first scrolling mode and a second scrolling mode on the basis of the movement of the pointer.

21. The cellular telephone of claim 20, wherein the pointer moves within a pointer movement frame and wherein the telephone switches between the first scrolling mode and the second scrolling mode when the pointer is brought into contact with the top edge or the bottom edge of the pointer movement frame.

22. The cellular telephone of claim 20, wherein the range over which the button can slide corresponds to a range of motion of the pointer on the display.

23. The cellular telephone of claim 20, wherein the first scrolling mode is a line scrolling mode and the second scrolling mode is a page scrolling mode.

24. The cellular telephone of claim 23, wherein line scrolling is performed in the line scrolling mode and page scrolling is performed in the page scrolling mode; and wherein depressing the button while in the line scrolling mode causes line scrolling and depressing the button while in the page scrolling mode causes page scrolling.

* * * * *